United States Patent
Xu et al.

(10) Patent No.: US 9,122,360 B2
(45) Date of Patent: Sep. 1, 2015

(54) SURFACE CAPACITIVE TOUCH PANEL AND ELECTRONIC DEVICE

(75) Inventors: Fang Xu, Beijing (CN); Ke Shang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 165 days.

(21) Appl. No.: 13/265,982

(22) PCT Filed: Apr. 22, 2010

(86) PCT No.: PCT/CN2010/072027
§ 371 (c)(1),
(2), (4) Date: Oct. 24, 2011

(87) PCT Pub. No.: WO2010/121552
PCT Pub. Date: Oct. 28, 2010

(65) Prior Publication Data
US 2012/0044205 A1    Feb. 23, 2012

(30) Foreign Application Priority Data

Apr. 23, 2009  (CN) .......................... 2009 1 0082632

(51) Int. Cl.
*G06F 3/041*  (2006.01)
*G06F 3/044*  (2006.01)
*G06F 3/045*  (2006.01)

(52) U.S. Cl.
CPC ............... *G06F 3/044* (2013.01); *G06F 3/045* (2013.01); *G06F 3/0418* (2013.01); *G06F 2203/04113* (2013.01)

(58) Field of Classification Search
CPC ....... G06F 3/041; G06F 3/0412; G06F 3/044; G06F 3/045; G06F 2203/04113
USPC ............... 345/156, 173, 174; 178/18.01, 178/18.05–18.07, 20.01–20.04
See application file for complete search history.

(56) References Cited

U.S. PATENT DOCUMENTS

| | | | | |
|---|---|---|---|---|
| 5,045,644 | A | * | 9/1991 | Dunthorn .................. 178/18.05 |
| 6,593,916 | B1 | | 7/2003 | Aroyan |
| 2003/0230438 | A1 | * | 12/2003 | Keefer et al. ............. 178/18.05 |

FOREIGN PATENT DOCUMENTS

| | | |
|---|---|---|
| CN | 1561500 A | 1/2005 |
| CN | 1659506 A | 8/2005 |
| CN | 101414070 A | 4/2009 |
| JP | 2008-83899 A | 4/2008 |

OTHER PUBLICATIONS

PCT/CN2010/072027 International Search Report dated May 17, 2010 (5 pages).

(Continued)

*Primary Examiner* — Ilana Spar
(74) *Attorney, Agent, or Firm* — Brinks Gilson & Lione; G. Peter Nichols

(57) ABSTRACT

The invention provides a surface capacitive touch panel and an electronic device, said surface capacitive touch panel comprising: a resistive film, on which an electrode setting area divided into at least two layers is set; and a plurality of conductive electrodes, set in said electrode setting area; said plurality of conductive electrodes including at least one set of electrodes; wherein, said set of electrodes includes: a first strip electrode; a second strip electrode, in parallel with said first strip electrode, but in a different layer; a third strip electrode, in parallel with said first strip electrode, but in a different layer; said second strip electrode and said third strip electrode being located on the same side of said first strip electrode; a fourth strip electrode, both ends of which are connected with said first strip electrode and said second strip electrode, respectively; and a fifth strip electrode, both ends of which are connected with said first strip electrode and said third strip electrode, respectively. The invention enhances the linear degree of the electrical field applied to the resistive film, thereby enhancing the positioning accuracy.

11 Claims, 17 Drawing Sheets

(56) References Cited

OTHER PUBLICATIONS

PCT/CN2010/072027International Preliminary Report on Patentability dated Oct. 25, 2011 (6 pages).
Chinese First Office Action with English Translation for related Application No. 2009100826326 dated Jun. 2, 2011, 14 pages.
Chinese Second Office Action with English Translation for related Application No. 2009100826326 dated Jan. 4, 2012, 9 pages.
Chinese Rejection Decision with English Translation for related Application No. 2009100826326 dated May 3, 2012, 15 pages.

* cited by examiner

SURFACE CAPACITIVE TOUCH PANEL AND ELECTRONIC DEVICE

BACKGROUND

The present invention relates to touch panel technology, and in particular, to a surface capacitive touch panel and an electronic device.

The advantages of capacitive touch panel lie in that the sensitivity is high, no pressure is needed for sensing, and it can provide a good user experience.

Now, the capacitive touch panels are mainly divided into two types: projected capacitive touch panels and surface capacitive touch panels. Among these, the surface capacitive touch panels only support single-point touch, but do not support multiple-point touch; while the projected capacitive touch panels support multiple-point touch. The surface capacitive touch panels may have a structure of single-layer Indium-Tin Oxide (ITO), the cost of which prevails over that of the resistive touch panels, so the surface capacitive touch panels may replace the resistive touch panels in the future, as main touch panels used in low end and medium electronic products.

FIG. 1 is a schematic diagram of the electrode distribution of one corner of a surface capacitive touch panel, As shown in FIG. 1, a plurality of electrodes are set on a resistive film, and said electrodes can include: a ladder-shaped electrode 11; a strip electrode 12 with a first length; a strip electrode 13 with a second length; right angle electrodes 14 located at four corners.

Of course, there may be Z shaped electrodes, triangle electrodes and so on.

During implementing embodiments of the invention, the inventor discovered that the existing surface capacitive touch panels have at least the following problems.

In the surface capacitive touch panels, the detection accuracy depends on the linearity of the electrical field applied to the resistive film. Therefore, in order to enhance the positioning accuracy, more uniform and more linearized electrical field is required. The current solution of the existing surface capacitive touch panel is to distribute the linear pattern outside the touch area of the touch panel to realize a linear electrical field, but the linear degree of the electrical field obtained by the existing electrode pattern can not satisfy the requirement for high accuracy positioning, and this greatly limits the application of the surface capacitive touch panel, and this phenomenon is prominent especially in a wide touch panel.

SUMMARY

The object of the embodiments of the invention is to provide a surface capacitive touch panel and an electronic device for enhancing the linear degree of the electrical field applied to the resistive film.

To realize the above object, an embodiment of the invention provides a surface capacitive touch panel, comprising: a resistive film, on which an electrode setting area divided into at least two layers is set; a plurality of conductive electrodes, set in said electrode setting area; said plurality of conductive electrodes including at least one set of electrodes; wherein, said set of electrodes includes: a first strip electrode; a second strip electrode, in parallel with said first strip electrode, but in a different layer; a third strip electrode, in parallel with said first strip electrode, but in a different layer; said second strip electrode and said third strip electrode being located on the same side of said first strip electrode; a fourth strip electrode, both ends of which are connected with said first strip electrode and said second strip electrode, respectively; and a fifth strip electrode, both ends of which are connected with said first strip electrode and said third strip electrode, respectively.

In the above surface capacitive touch panel, said second strip electrode and said third strip electrode are located in the same layer.

In the above surface capacitive touch panel, said set of electrodes has an axially-symmetric structure.

In the above surface capacitive touch panel, said second strip electrode and said third strip electrode have the same length.

In the above surface capacitive touch panel, said second strip electrode is axially-symmetric with respect to a straight line where the fourth strip electrode is located, and said third strip electrode is axially-symmetric with respect to a straight line where the fifth strip electrode is located.

In the above surface capacitive touch panel, in the connections formed by the fourth and fifth strip electrodes, and the first, second and third strip electrodes, there is at least one "⊤" shaped connection.

In order to realize the above object, an embodiment of the invention further provides an electronic device, including a circuit board and a surface capacitive touch panel, said surface capacitive touch panel comprising: a resistive film, on which an electrode setting area divided into at least two layers is set; and a plurality of conductive electrodes, set in said electrode setting area; said plurality of conductive electrodes including supply electrode; said plurality of conductive electrodes including at least one set of electrodes; wherein, said set of electrodes includes: a first strip electrode; a second strip electrode, in parallel with said first strip electrode, but in a different layer; a third strip electrode, in parallel with said first strip electrode, but in a different layer; said second strip electrode and said third strip electrode being located on the same side of said first strip electrode; a fourth strip electrode, both ends of which are connected with said first strip electrode and said second strip electrode, respectively; a fifth strip electrode, both ends of which are connected with said first strip electrode and said third strip electrode, respectively; and a touch panel driving module, connected with said supply electrode and said board.

In the above electronic device, said second strip electrode and said third strip electrode are located in the same layer.

In the above electronic device, said set of electrodes has an axially-symmetric structure.

In the above electronic device, said second strip electrode and said third strip electrode have the same length.

In the above electronic device, said second strip electrode is axially-symmetric with respect to a straight line where the fourth strip electrode is located, and said third strip electrode is axially-symmetric with respect to a straight line where the fifth strip electrode is located.

In the above electronic device, in the connections formed by the fourth and fifth strip electrodes, and the first, second and third strip electrodes, there is at least one "⊤" shaped connection.

In the above electronic device, said surface capacitive touch panel is a wide touch panel.

The embodiments of the invention has the following beneficial effects:

In the surface capacitive touch panel and the electronic device of the embodiments of the invention, by setting a ∏ shaped electrode in the electrode setting area, in this electrode, electricity flows in two directions. If the electrode proposed by the embodiments of the invention is set in the vertical direction, this will prominently influence the voltage gradient in the horizontal direction, while if the electrode proposed by the embodiments of the invention is set in the horizontal direction, this will prominently influence the voltage gradient in the vertical direction, and the linear degree of the electrical field applied to the resistive film could be enhanced, so as to enhance the positioning accuracy.

DETAILED DESCRIPTION

In the surface capacitive touch panel and the electronic device of the embodiment of the invention, by setting a ∏ shaped electrode in the electrode setting area, the uniformity of the electrical field applied to the resistive film can be enhanced.

In the embodiment of the invention, a surface capacitive touch panel, comprising: a resistive film, on which an electrode setting area divided into at least two layers is set; the resistive film is formed by at least one of ITO and ATO materials; a plurality of conductive electrodes, set in said electrode setting area; wherein, said plurality of conductive electrodes including at least one set of electrodes, said set of electrodes includes: a first strip electrode, set in the electrode setting area; a second strip electrode, set in the electrode setting area, and in parallel with said first strip electrode, but in a different layer; a third strip electrode, set in the electrode setting area, and in parallel with said first strip electrode, but in a different layer; said second strip electrode and said third strip electrode being located on the same side of said first strip electrode; a fourth strip electrode, set in the electrode setting area, both ends of which are connected with said first strip electrode and said second strip electrode, respectively; and a fifth strip electrode, set in the electrode setting area, both ends of which are connected with said first strip electrode and said third strip electrode, respectively.

The electrode number of the set of electrodes can be one or more, while they can be arranged symmetrically with respect to the symmetric axis of the electrode setting area.

The arrangement manners of the set of electrodes in the embodiment of the invention will be explained in detail below.

Arrangement Manner 1

Figure 2:
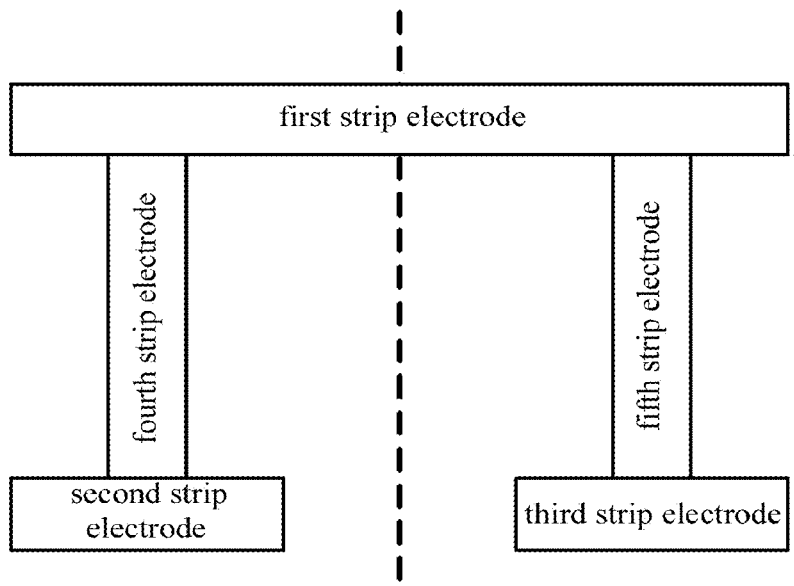
FIG. 2-FIG. 10 illustrate arrangement manners of a set of electrodes in an embodiment of the invention.

As shown in FIG. 2, FIG. 2 is an arrangement manner of the set of electrodes in the embodiment of the invention, wherein, the second strip electrode and the third strip electrode are located in the same layer, and the pattern formed by the set of electrodes is an axially symmetrical pattern.

The second strip electrode is axially-symmetric with respect to a straight line where the fourth strip electrode is located;

The fifth strip electrode is axially-symmetric with respect to a straight line where the third strip electrode is located.

Arrangement Manner 2

Figure 3:
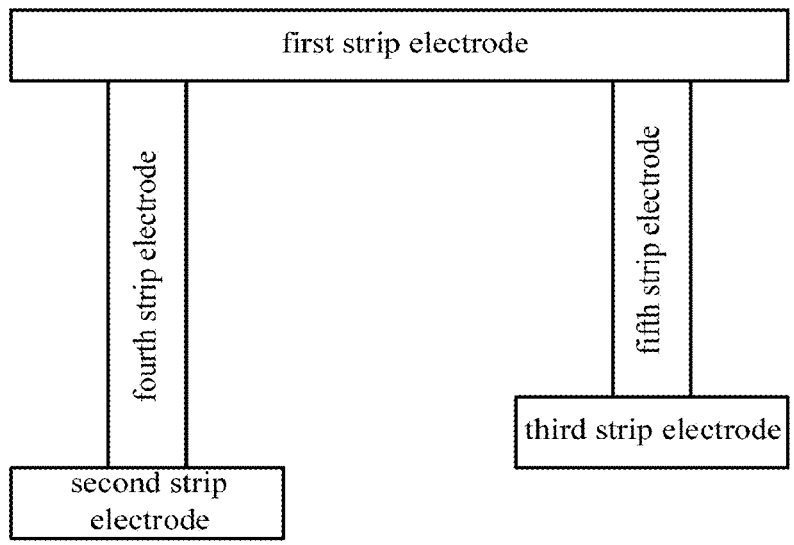

As shown in FIG. 3, FIG. 3 is an arrangement manner of the set of electrodes in the embodiment of the invention, wherein, the second strip electrode and the third strip electrode are located in different layers.

Arrangement Manner 3

Figure 4:
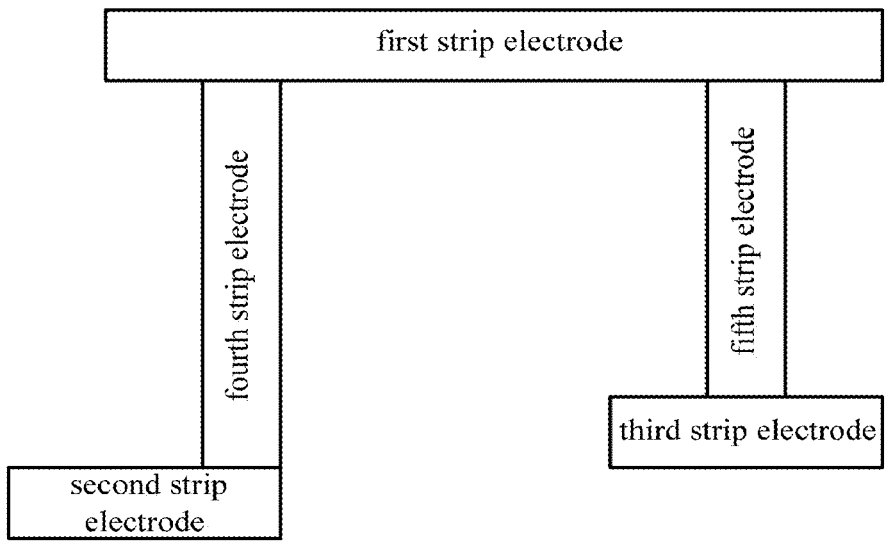

As shown in FIG. 4, FIG. 4 is an arrangement manner of the set of electrodes in the embodiment of the invention. FIG. 4 differs from the arrangement manner as show in FIG. 3 in that, the relative position of the fourth strip electrode with respect to the second strip electrode is changed.

Arrangement Manner 4

Figure 5:
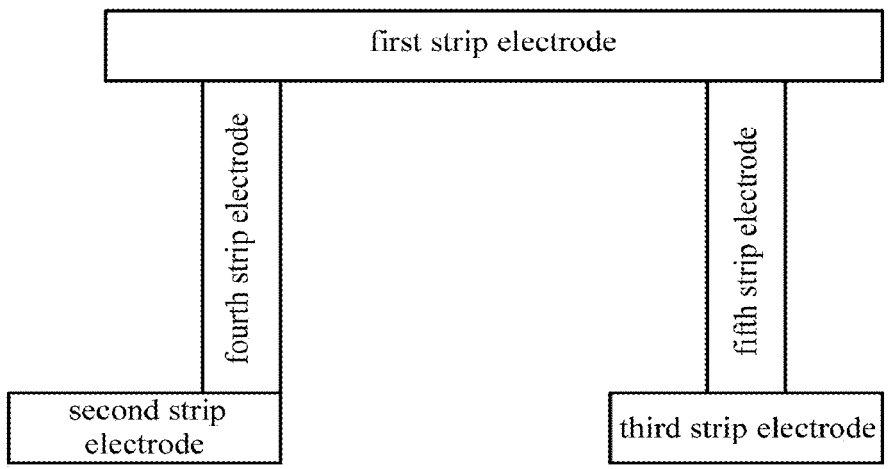

As shown in FIG. 5, FIG. 5 is an arrangement manner of the set of electrodes in the embodiment of the invention. FIG. 5 differs from the arrangement manner as show in FIG. 4 in that, the second strip electrode and the third strip electrode are in the same layer.

Arrangement Manner 5

Figure 6:
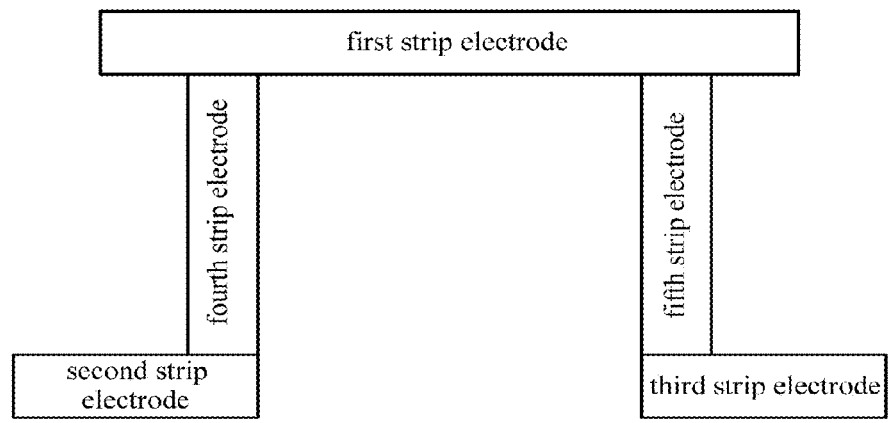

As shown in FIG. 6, FIG. 6 is an arrangement manner of the set of electrodes in the embodiment of the invention. FIG. 6 differs from the arrangement manner as show in FIG. 5 in that, the relative position of the fifth strip electrode with respect to the third strip electrode is changed.

Arrangement Manner 6

Figure 7:
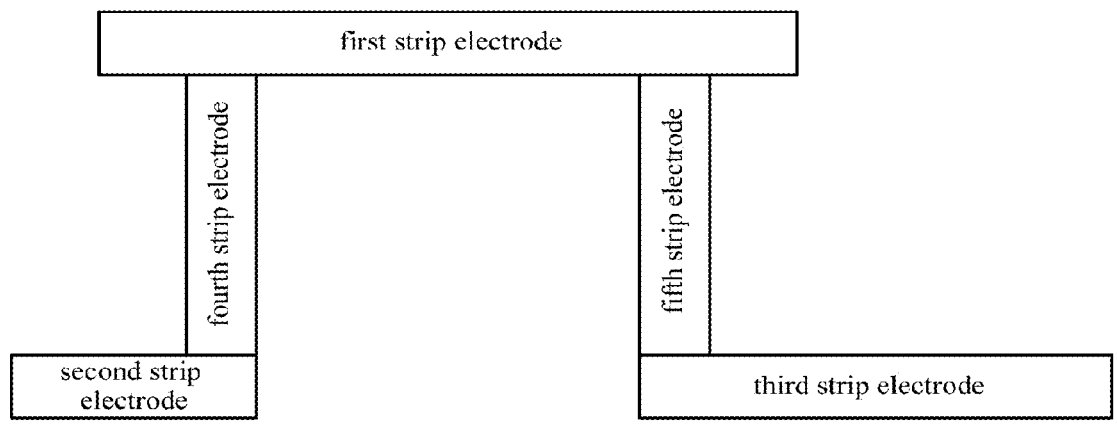

As shown in FIG. 7, FIG. 7 is an arrangement manner of the set of electrodes in the embodiment of the invention. FIG. 7 differs from the arrangement manner as show in FIG. 6 in that, the second strip electrode and the third strip electrode are different in length.

Arrangement Manner 7

Figure 8:
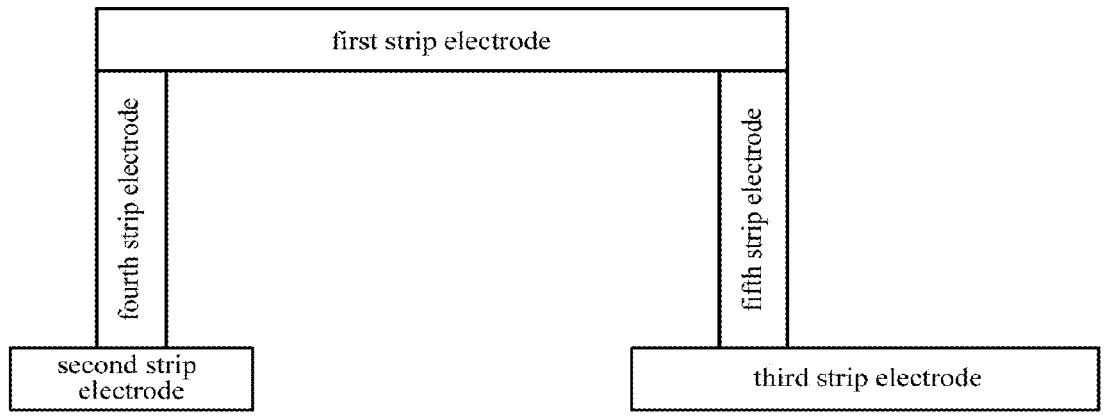

As shown in FIG. 8, FIG. 8 is an arrangement manner of the set of electrodes in the embodiment of the invention. FIG. 8 differs from the arrangement manner as show in FIG. 7 in that, the relative positions of the fourth strip electrode and the fifth strip electrode, with respect to the first strip electrode, are changed. In addition, compared to the arrangement manner as shown in FIG. 7, the relative position of the fourth strip electrode with respect to the second strip electrode is changed, and the relative position of the fifth strip electrode with respect to the third strip electrode is also changed.

Arrangement Manner 8

Figure 9:
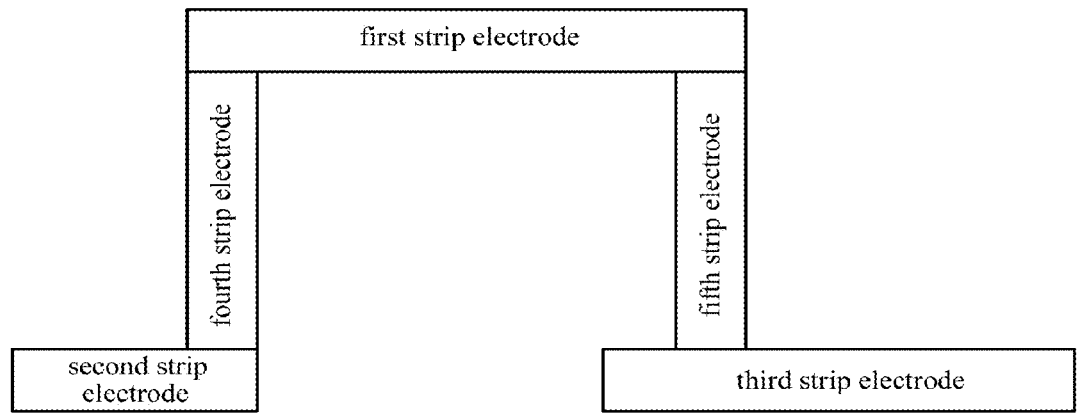

As shown in FIG. 9, FIG. 9 is an arrangement manner of the set of electrodes in the embodiment of the invention. FIG. 9 differs from the arrangement manner as show in FIG. 8 in that, the relative position of the fourth strip electrode with respect to the second strip electrode is changed.

Arrangement Manner 9

In the above various arrangement manners, in the connections formed among the fourth, the fifth strip electrodes and the first, the second and the third strip electrodes, there is at least one "⊤" shaped connection. That is, in the connection points among the fourth, the fifth strip electrodes and the first, second and third strip electrodes, there is at least one connection point that is not formed by the connections between end points of the two strip electrodes.

As shown in FIG. 2 and FIG. 3, all connections form "⊤" shaped connection.

Figure 10:
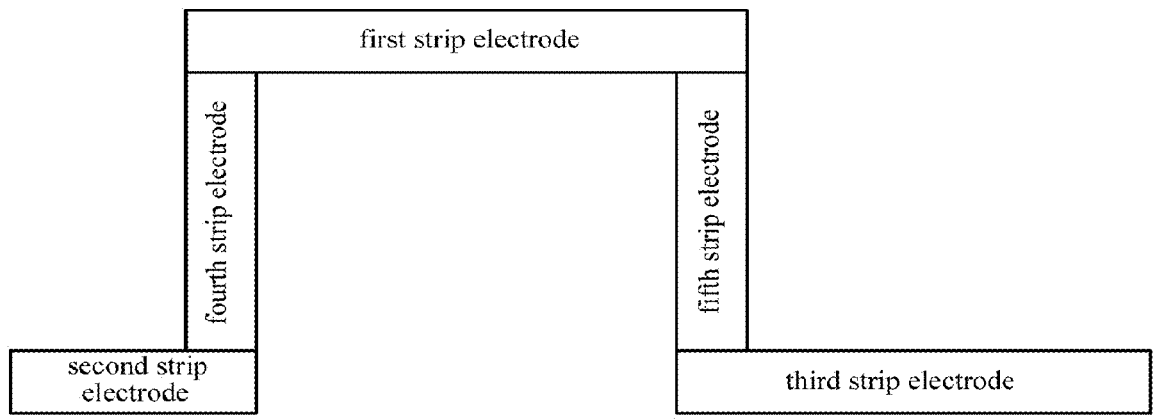

As shown in FIG. 10, FIG. 10 is an arrangement manner of the set of electrodes in the embodiment of the invention. FIG. 10 differs from the arrangement manner as shown In FIG. 8 in that, the relative position of the fourth/the fifth strip electrode with respect to the second/the third strip electrode is changed, and neither of the connections is "⊤" shaped connection, that is, all the connections are connections between the end points and the end points.

Certainly, there are other possible combination manners, which will not be listed herein.

In all, the above-mentioned conditions should be satisfied, which are:

Said second strip electrode and the third strip electrode are located in the same side of the first strip electrode, and both of said second strip electrode and the third strip electrode are located in different layers from the first strip electrode;

Said second strip electrode and said first strip electrode are connected through the fourth strip electrode, and said third strip electrode and said first strip electrode are connected through the fifth strip electrode.

Figure 11:
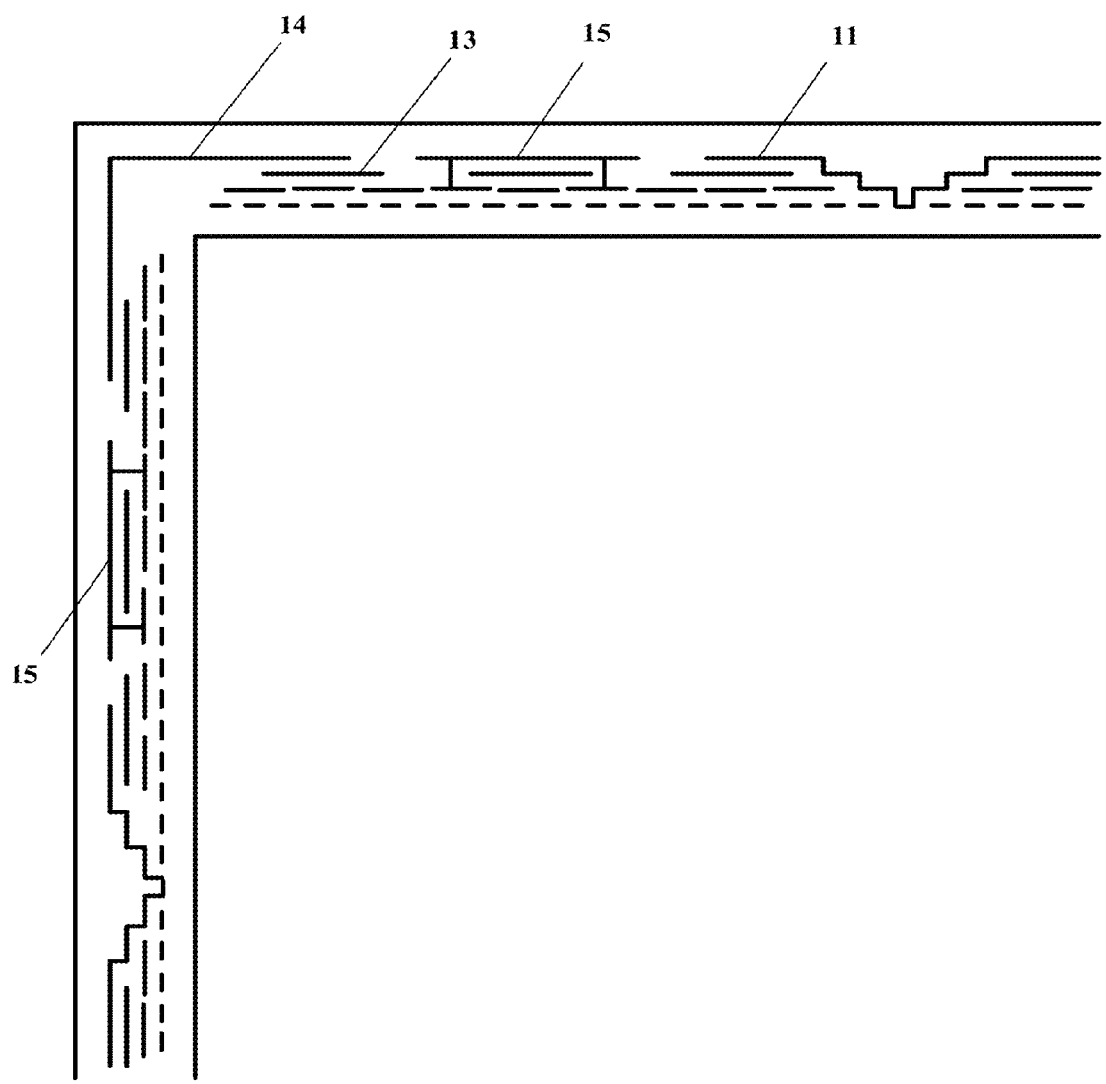
FIG. 11 is a schematic diagram of the distribution of the electrodes on a corner of a surface capacitive touch panel of an embodiment of the invention.

That is, the following relationships are not fixed:

The second/third strip electrode and the first strip electrode can be adjacent to each other, or there can be one layer or more layers between the second/third strip electrode and the first strip electrode;

The lengths of the second strip electrode and the third strip electrode are not necessary to be equal;

The five electrodes may form an axially-symmetric pattern, or not;

The connection positions of the fourth/fifth strip electrode and the first strip electrode are not fixed;

The connection positions of the fourth strip electrode and the second strip electrode are not fixed;

The connection positions of the fifth strip electrode and the third strip electrode are not fixed;

As shown in FIG. 11, FIG. 11 is a schematic diagram of the distribution of the electrodes on a corner of a surface capacitive touch panel of an embodiment of the invention, in which a plurality of electrodes are set on a resistive film, and the plurality of electrodes can include (such as): a ladder-shaped electrode 11; a strip electrode 12 with a first length; a strip electrode 13 with a second length; . . . right angle electrodes 14 located at four corners.

However, compared to the existing surface capacitive touch panels, the surface capacitive touch panel further includes: a set of electrodes 15, wherein, the second strip electrode and the third strip electrode are distributed in the same layer, and there is an layer between the first strip electrode and the second/third strip electrode.

Figure 12:
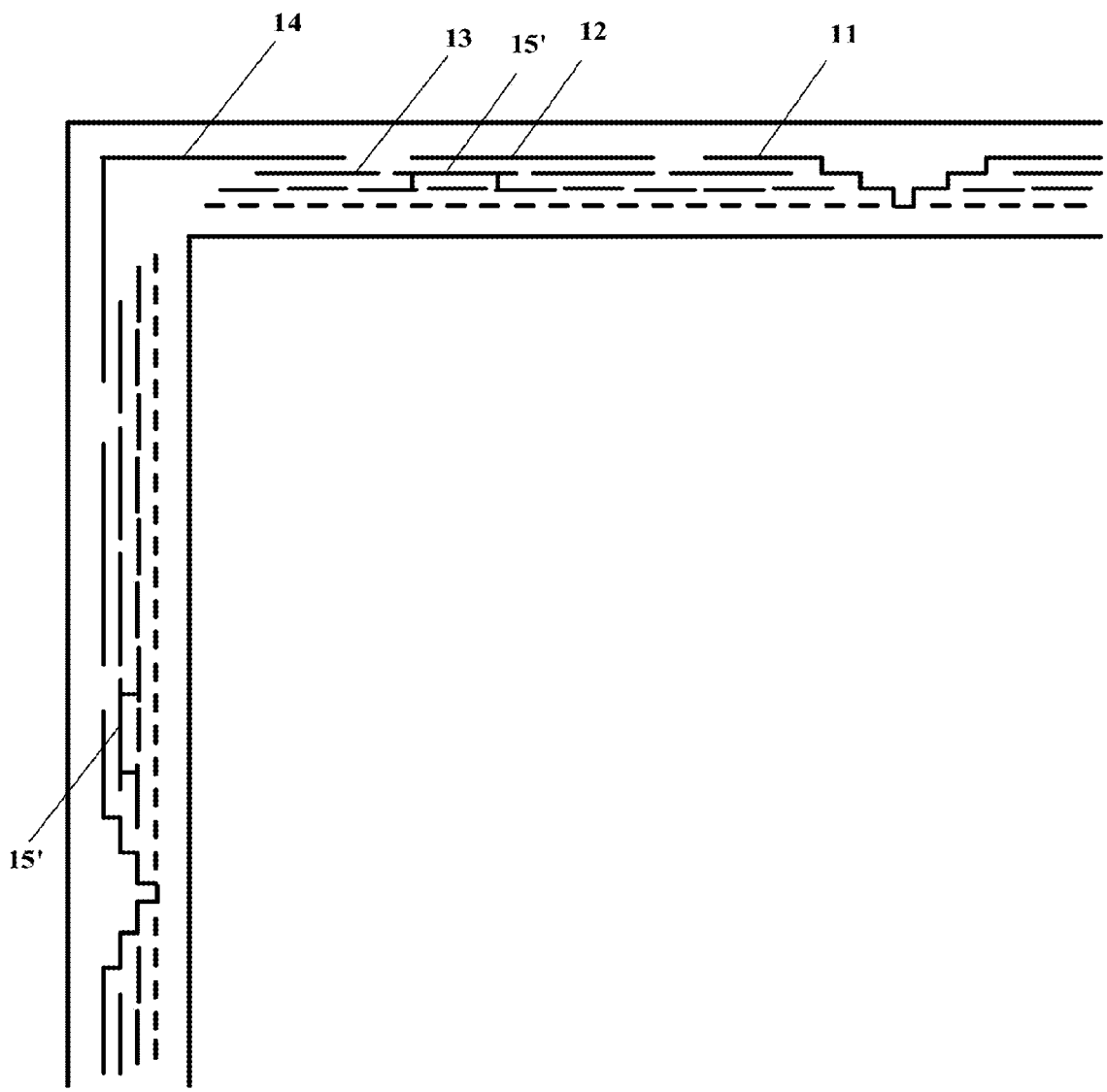
FIG. 12 is a schematic diagram of the distribution of the electrodes on a corner of a surface capacitive touch panel of an embodiment of the invention.

As shown in FIG. 12, FIG. 12 is a schematic diagram of the distribution of the electrodes on a corner of a surface capacitive touch panel of an embodiment of the invention, in which a plurality of electrodes are set on a resistive film, and the plurality of electrodes can include such as: a ladder-shaped electrode 11; a strip electrode 12 with a first length; a strip electrode 13 with a second length; . . . a right angle electrodes 14 located at four corners.

However, compared to the existing surface capacitive touch panels, the surface capacitive touch panel further includes: a set of electrodes 15', wherein, the second strip electrode and the third strip electrode are also distributed in the same layer, but are adjacent to the first strip electrode in an adjacent layer.

Certainly, the various arrangement manners as shown in FIG. 2 to FIG. 10 can be applied, which will not be explained one by one herein.

Below, the linear degree of the electrical field of the surface capacitive touch panel of the embodiment of the invention will be explained with a particular simulation result.

The simulation result is as follows:

Voltages are applied to the four corners of the touch panel, respectively, wherein, +5V voltages are applied to the left top corner and the right top corner, respectively; and 0V voltages are applied to the left bottom corner and the right bottom corner.

Figure 1:
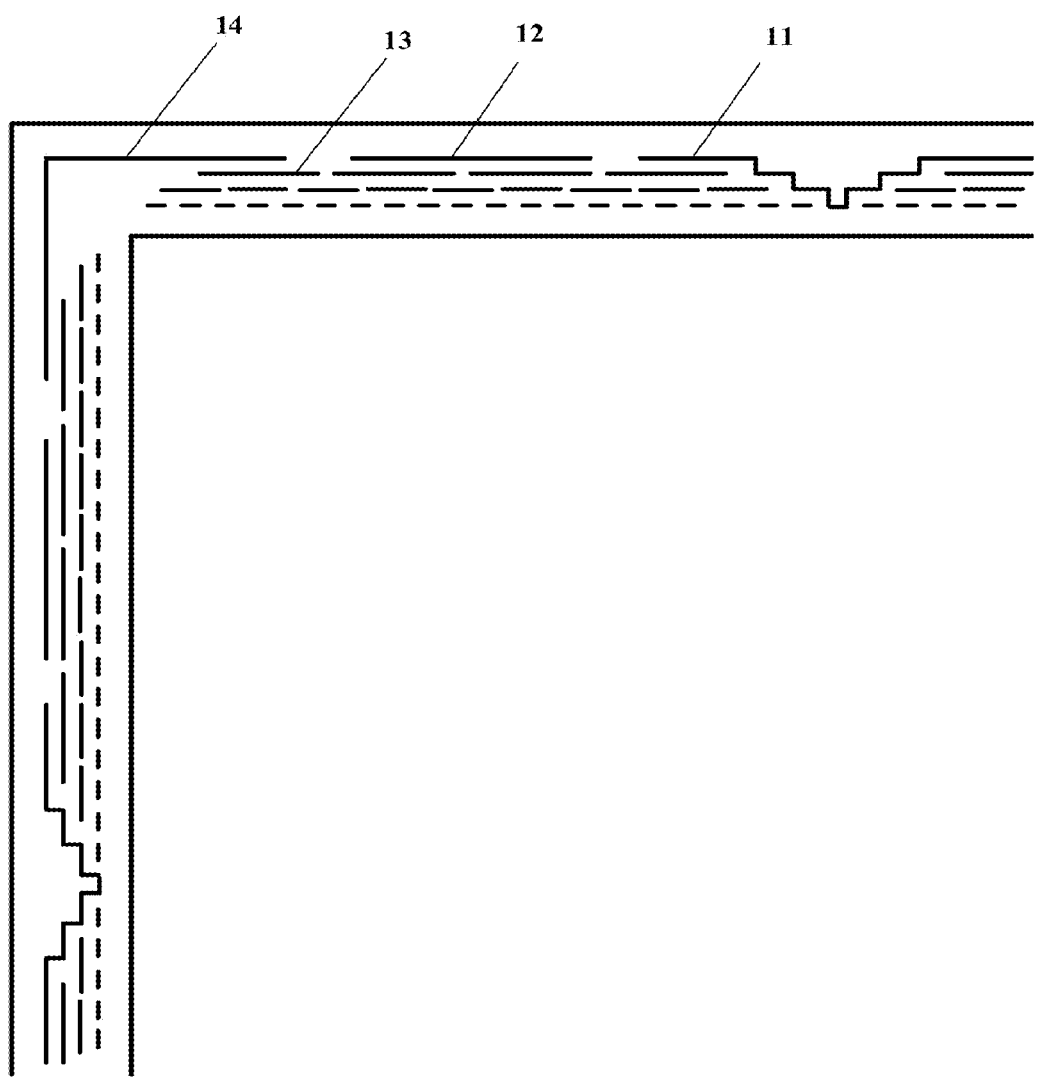
FIG. 1 is a schematic diagram of the distribution of the electrodes on a corner of an existing surface capacitive touch panel.
Figure 13:
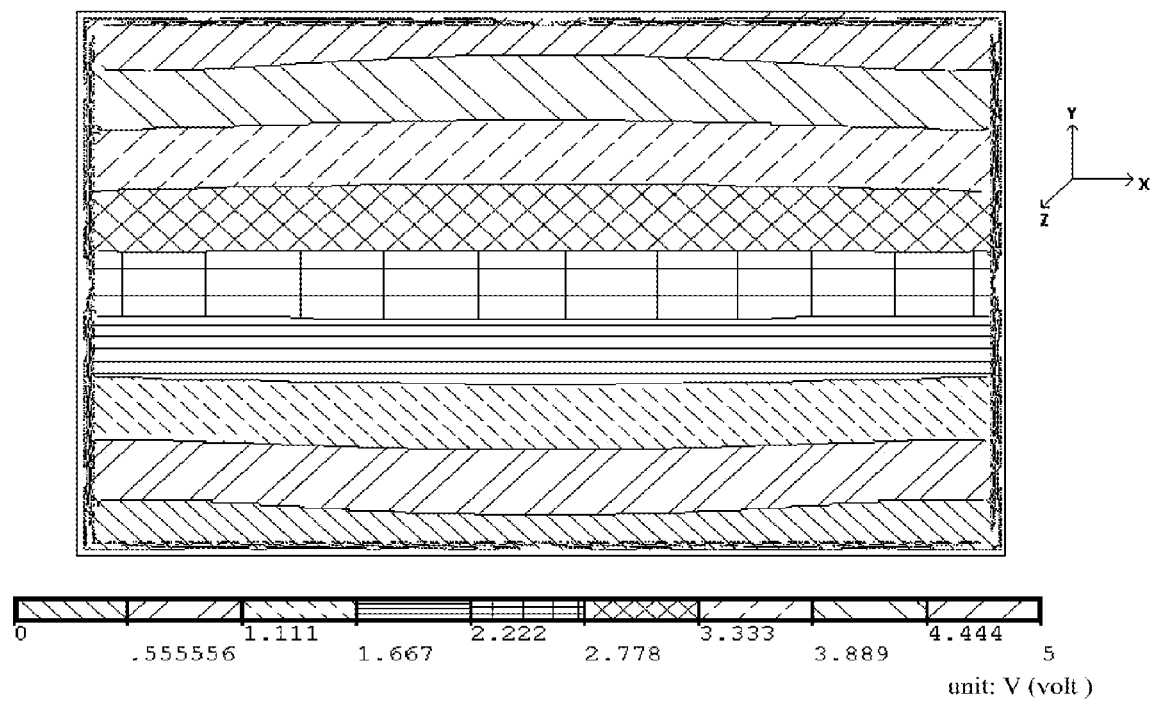
FIG. 13 is a schematic diagram of the simulation of horizontal equipotential lines of the existing surface capacitive touch panel.

FIG. 13 is a schematic diagram of the horizontal equipotential lines (i.e., the electrical field in the vertical direction) of the surface capacitive touch panel as shown in FIG. 1. It can be seen from the drawing that, the horizontal equipotential lines have obvious nonlinear distortions, and especially the equipotential lines in the upper side and the lower side in the FIG. 12 have very obvious distortions.

Figure 14:
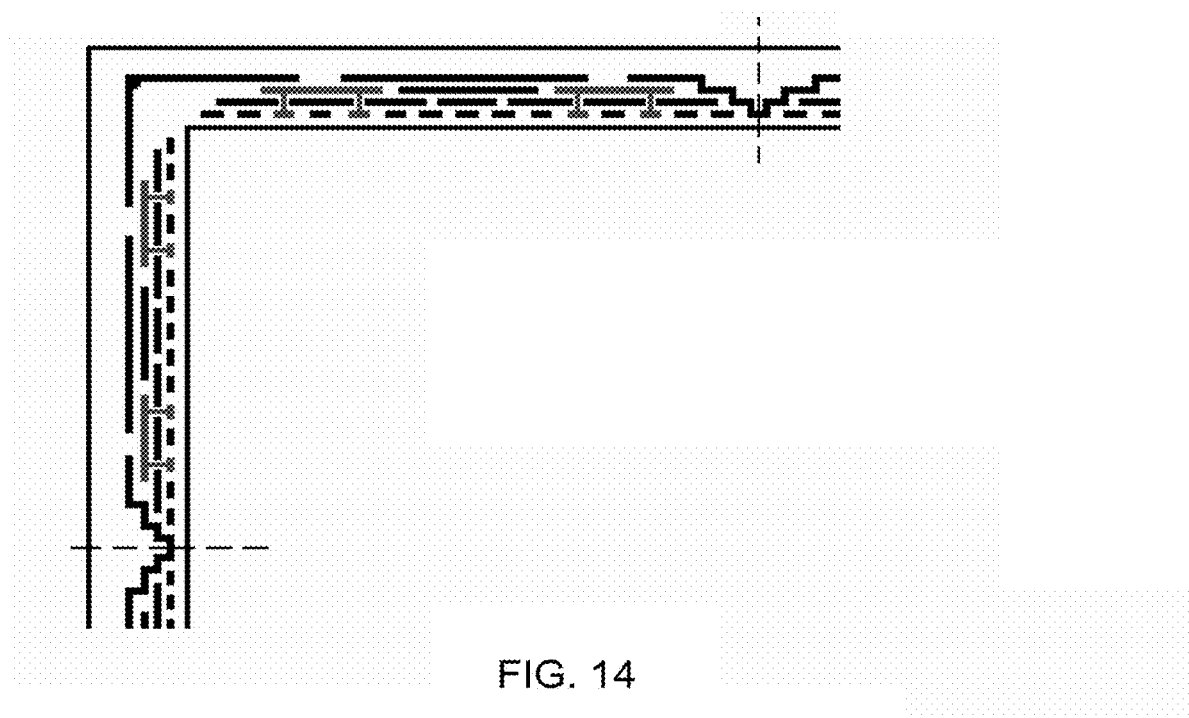
FIG. 14 is a schematic diagram of the distribution of the electrodes on a corner of another surface capacitive touch panel of an embodiment of the invention.
Figure 15:
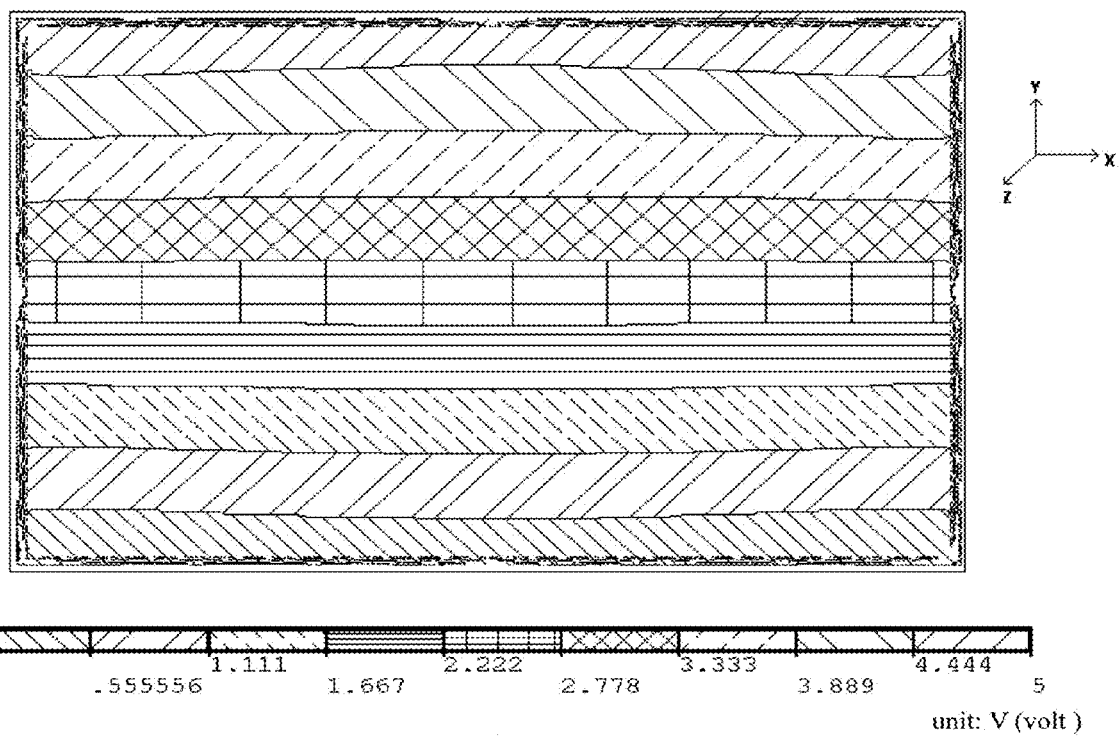
FIG. 15 is a schematic diagram of the simulation of horizontal equipotential lines of the surface capacitive touch panel with the electrode arrangement manner as shown in FIG. 14.

As shown in FIG. 14, FIG. 14 is a schematic diagram of the distribution of the electrodes on a corner of another surface capacitive touch panel of an embodiment of the invention, in which axially-symmetric Π shaped electrodes are included. FIG. 15 is a schematic diagram of the horizontal equipotential lines of the surface capacitive touch panel with the electrode arrangement manner as shown in FIG. 14. It can be seen from FIG. 15 that, compared to the simulation result of FIG. 13, in FIG. 15, the nonlinear distortions of the equipotential lines at the top and at the bottom in the horizontal direction are reduced.

Figure 16:
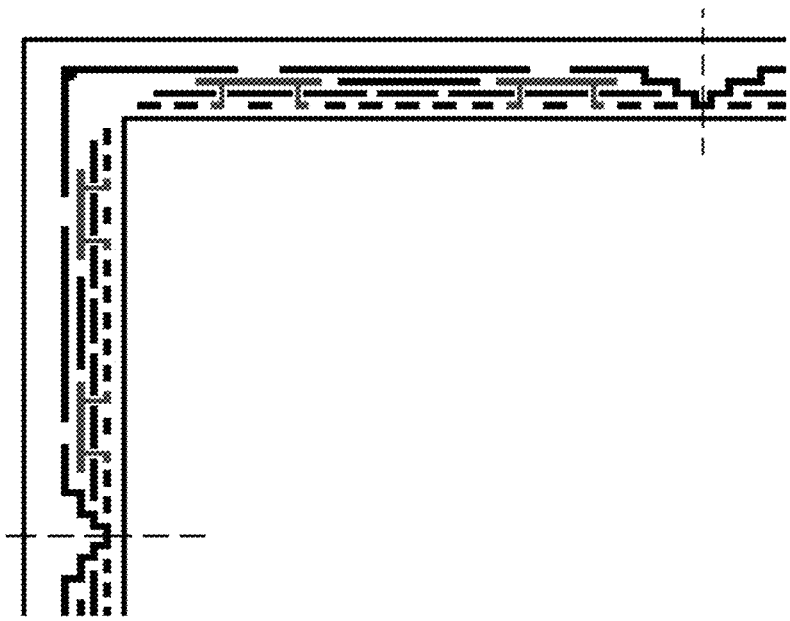
FIG. 16 is a schematic diagram of the distribution of the electrodes on a corner of another surface capacitive touch panel of an embodiment of the invention.
Figure 17:
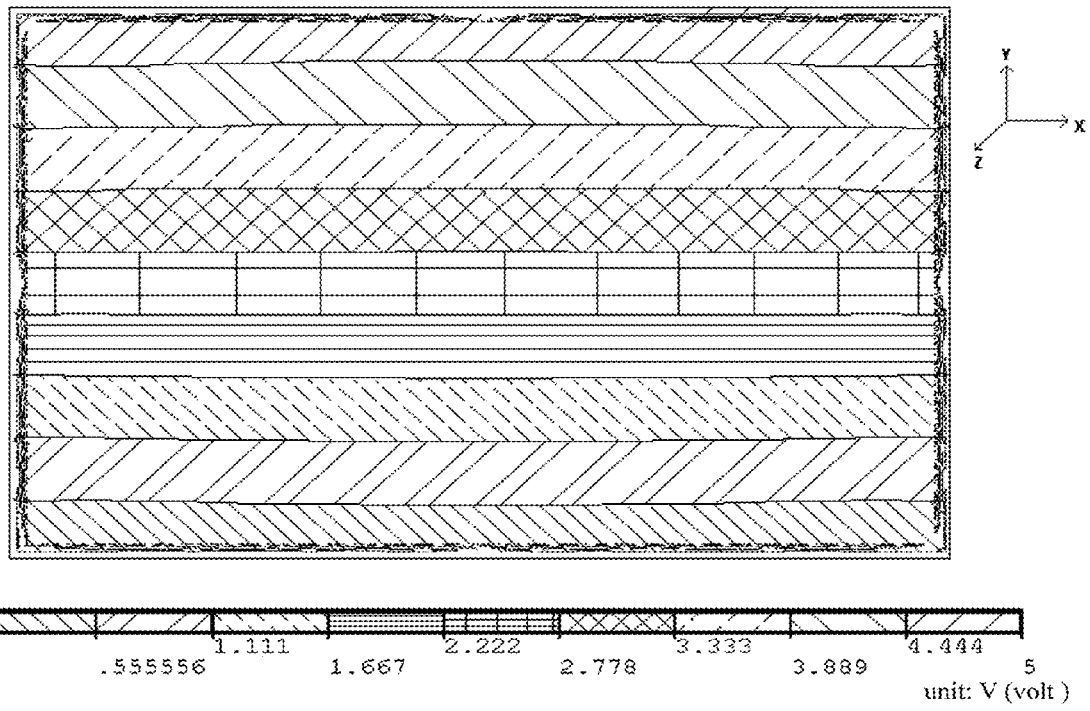
FIG. 17 is a schematic diagram of the simulation of horizontal equipotential lines of the surface capacitive touch panel with the electrode arrangement manner as shown in FIG. 16.

As shown in FIG. 16, FIG. 16 is a schematic diagram of the distribution of the electrodes on a corner of another surface capacitive touch panel of an embodiment of the invention, in which axially-symmetric Π shaped electrodes are included. Compared to the Π shaped electrodes in FIG. 13, the positions of the short electrodes at the bottom in FIG. 16 are changed. FIG. 17 is a schematic diagram of the horizontal equipotential lines of the surface capacitive touch panel with the electrode arrangement manner as shown in FIG. 16. It can be seen from FIG. 17 that, compared to the simulation result in FIG. 13, the nonlinear distortions of all the horizontal equipotential lines are obviously improved.

Figure 18:
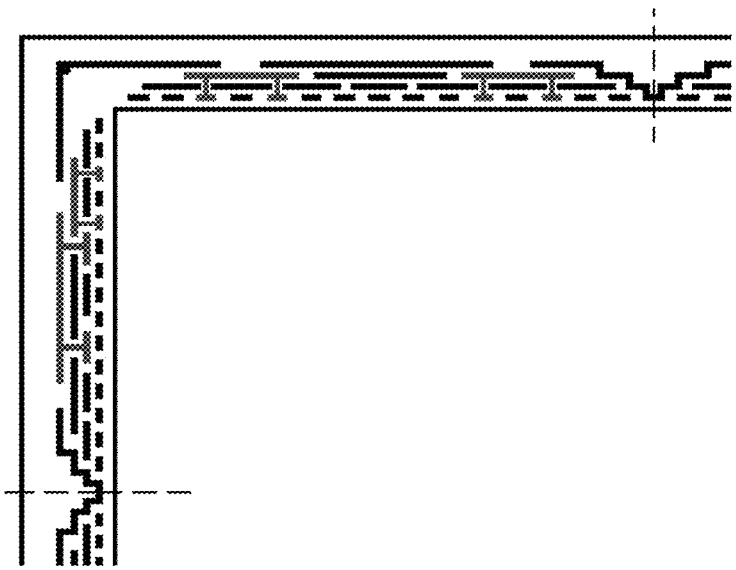
FIG. 18 is a schematic diagram of the distribution of the electrodes on a corner of another surface capacitive touch panel of an embodiment of the invention.
Figure 19:
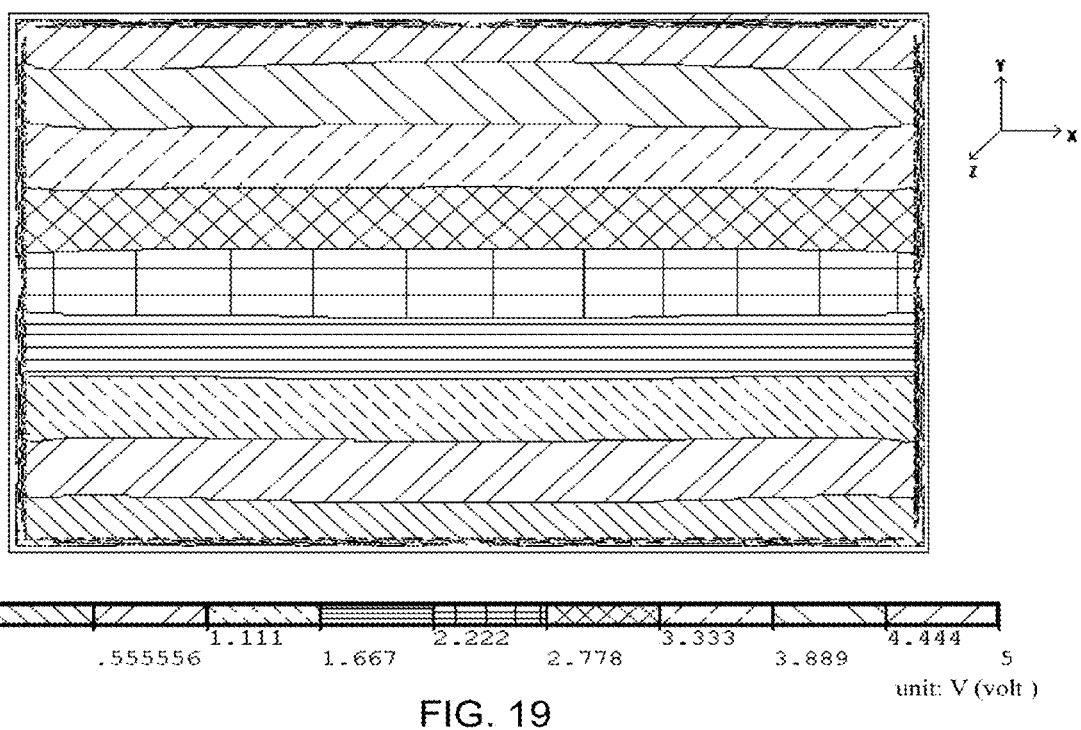
FIG. 19 is a schematic diagram of the simulation of horizontal equipotential lines of the surface capacitive touch panel with the electrode arrangement manner as shown in FIG. 18.

As shown in FIG. 18, FIG. 18 is a schematic diagram of the distribution of the electrodes on a corner of another surface capacitive touch panel of an embodiment of the invention, in which axially-symmetric Π shaped electrodes are included. Compared to the Π shaped electrodes in FIG. 14 and FIG. 16, the length of each of the plurality of Π shaped electrode is not equal to each other. FIG. 19 is a schematic diagram of the simulation of horizontal equipotential lines of the surface capacitive touch panel with the electrode arrangement manner as shown in FIG. 18. It can be seen from FIG. 19, compared to the simulation result in FIG. 13, the nonlinear distortions of all the horizontal equipotential lines are obviously improved.

Figure 20:
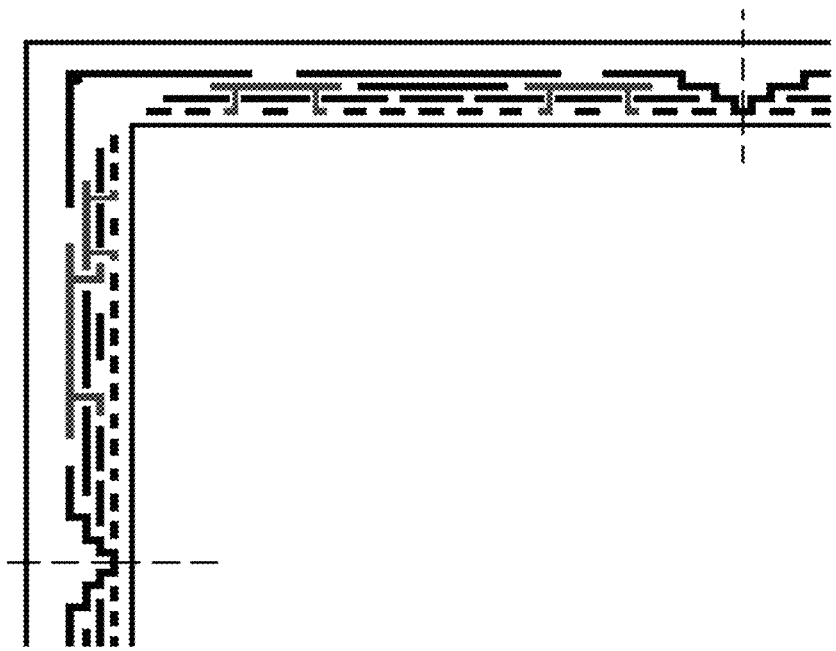
FIG. 20 is a schematic diagram of the distribution of the electrodes on a corner of another surface capacitive touch panel of an embodiment of the invention.
Figure 21:
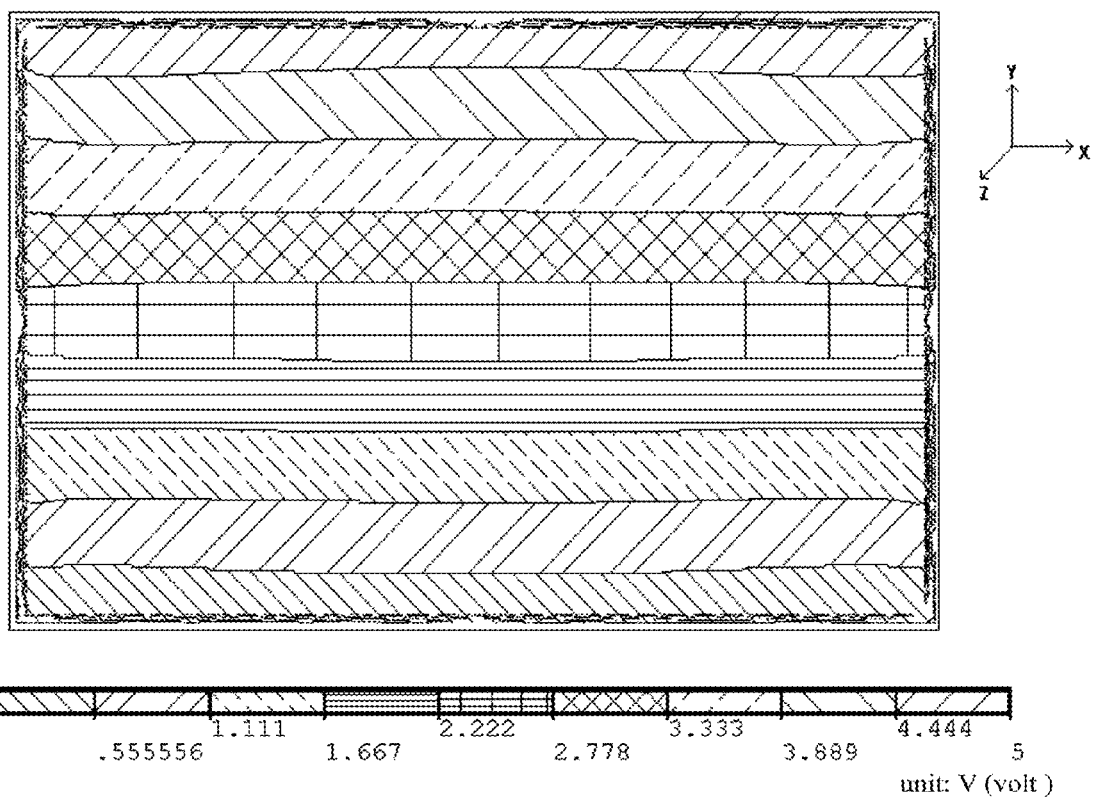
FIG. 21 is a schematic diagram of the simulation of horizontal equipotential lines of the surface capacitive touch panel with the electrode arrangement manner as shown in FIG. 20.

As show in FIG. 20, FIG. 20 is a schematic diagram of the distribution of the electrodes on a corner of another surface capacitive touch panel of an embodiment of the invention, in which axially-symmetric Π shaped electrodes are included. Compared to the Π shaped electrodes in FIG. 18, the positions of the short electrodes at the bottom of the Π shaped electrodes are changed. FIG. 21 is a schematic diagram of the simulation of horizontal equipotential lines of the surface capacitive touch panel in the electrode arrangement manner as shown in FIG. 20. It can be seen from FIG. 21 that, compared to the simulation result in FIG. 13, the nonlinear distortions of all the horizontal equipotential lines are obviously improved.

Figure 22:
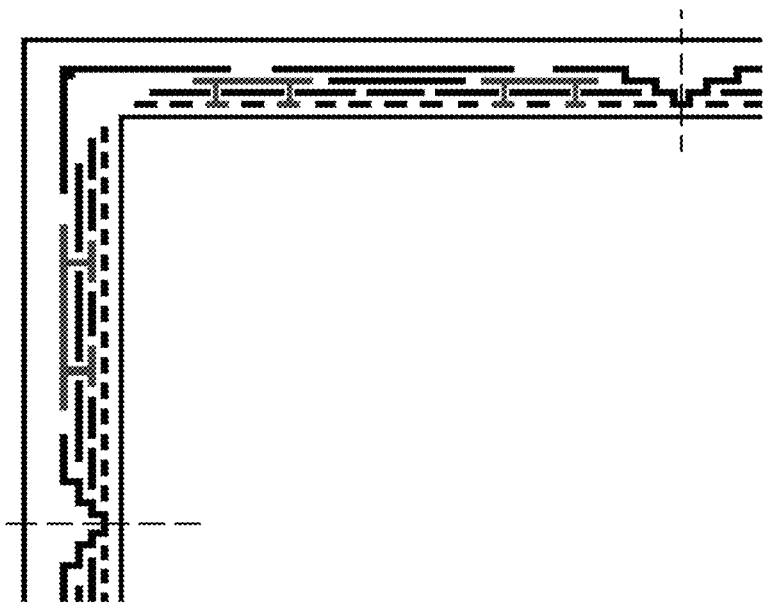
FIG. 22 is a schematic diagram of the distribution of the electrodes on a corner of another surface capacitive touch panel of an embodiment of the invention.
Figure 23:
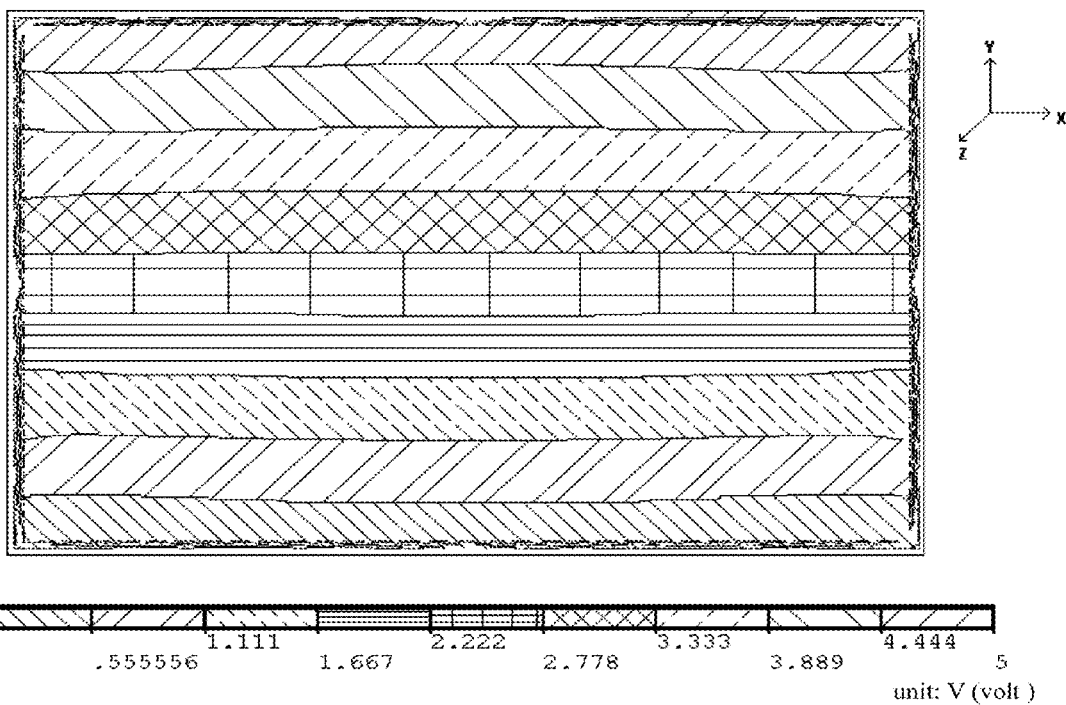
FIG. 23 is a schematic diagram of the simulation of horizontal equipotential lines of the surface capacitive touch panel with the electrode arrangement manner as shown in FIG. 22.

As show in FIG. 22, FIG. 22 is a schematic diagram of the distribution of the electrodes on a corner of another surface capacitive touch panel of an embodiment of the invention, in which axially-symmetric Π shaped electrodes are included, but the numbers of the Π shaped electrodes distributed in the both directions are not equal. FIG. 23 is a schematic diagram of the simulation of horizontal equipotential lines of the surface capacitive touch panel with the electrode arrangement manner as shown in FIG. 22, It can be seen from FIG. 23 that, compared to the simulation result in FIG. 13, the nonlinear distortions of all the horizontal equipotential lines are obviously improved.

Figure 24:
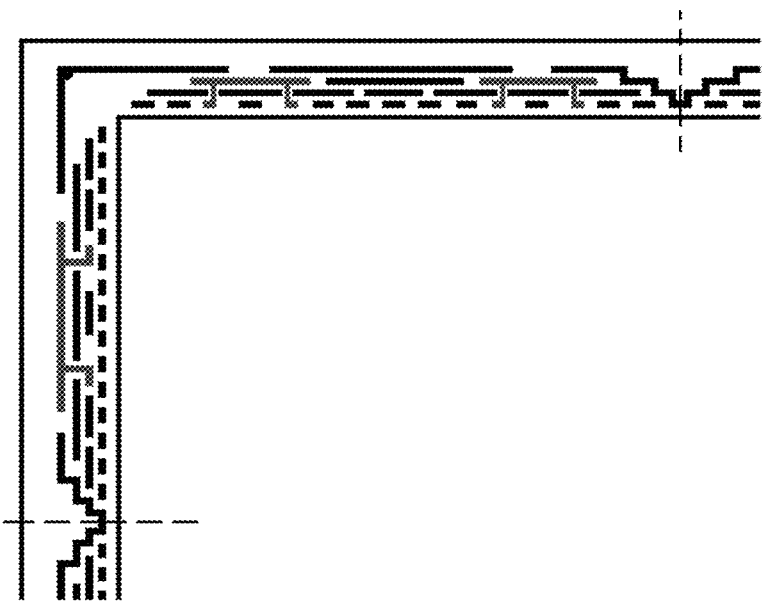
FIG. 24 is a schematic diagram of the distribution of the electrodes on a corner of another surface capacitive touch panel of an embodiment of the invention.
Figure 25:
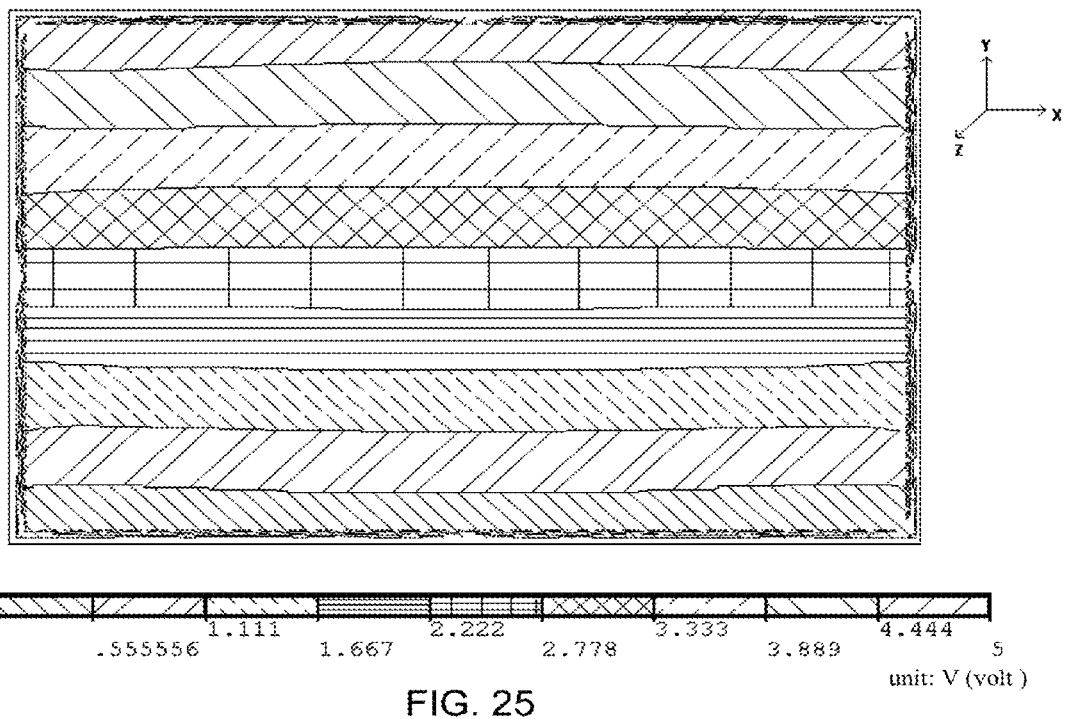
FIG. 25 is a schematic diagram of the simulation of horizontal equipotential lines of the surface capacitive touch panel with the electrode arrangement manner as shown in FIG. 24.

As show in FIG. 24, FIG. 24 is a schematic diagram of the distribution of the electrodes on a corner of another surface capacitive touch panel of an embodiment of the invention, in which axially-symmetric Π shaped electrodes are included, but the numbers of the Π shaped electrodes distributed in the both directions are not equal, and compared to the Π shaped electrodes in FIG. 22, the positions of the short electrodes at the bottom of the Π shaped electrodes are changed. FIG. 25 is a schematic diagram of the simulation of horizontal equipotential lines of the surface capacitive touch panel with the electrode arrangement manner as shown in FIG. 24, It can be seen from FIG. 25 that compared to the simulation result in FIG. 13, the nonlinear distortions of all the horizontal equipotential lines are obviously improved.

Certainly, there are other possible cases, but the simulations will not be listed all possible cases. However, it can be seen from the simulation results of the above plurality of arrangement manners that, compared to the existing surface capacitive touch panels, the nonlinear distortions of the horizontal equipotential lines are obviously improved, so that the positioning accuracy can be enhanced.

The electrode patterns proposed in the embodiments of the invention can improve the nonlinear distortion of the electrical field around the touch area, and in the electrode combination, electricity flows in two directions.

Meanwhile, it should be understood that, if the electrodes proposed in the embodiments of the invention are set in the vertical direction, the voltage gradient in the horizontal direction can be prominently influenced, while if the electrodes proposed in the embodiments of the invention are set in the horizontal direction, the voltage gradient in the vertical direction can be prominently influence. Therefore, by improving the voltage gradient, the positioning accuracy can be enhanced.

For the surface capacitive touch panel, only if the linear degree of the electrical filed is less than 1.5%, the practical demand can be satisfied, and after utilizing the electrode patterns proposed in the embodiments of the invention, the linear degree of the electrical filed is reduced to below 1%.

In the above embodiments and simulations, the set of electrodes exists independently, but certainly, the set can exist within a bigger set of electrodes, which will be explained by using FIG. 26 and FIG. 27.

Figure 26:
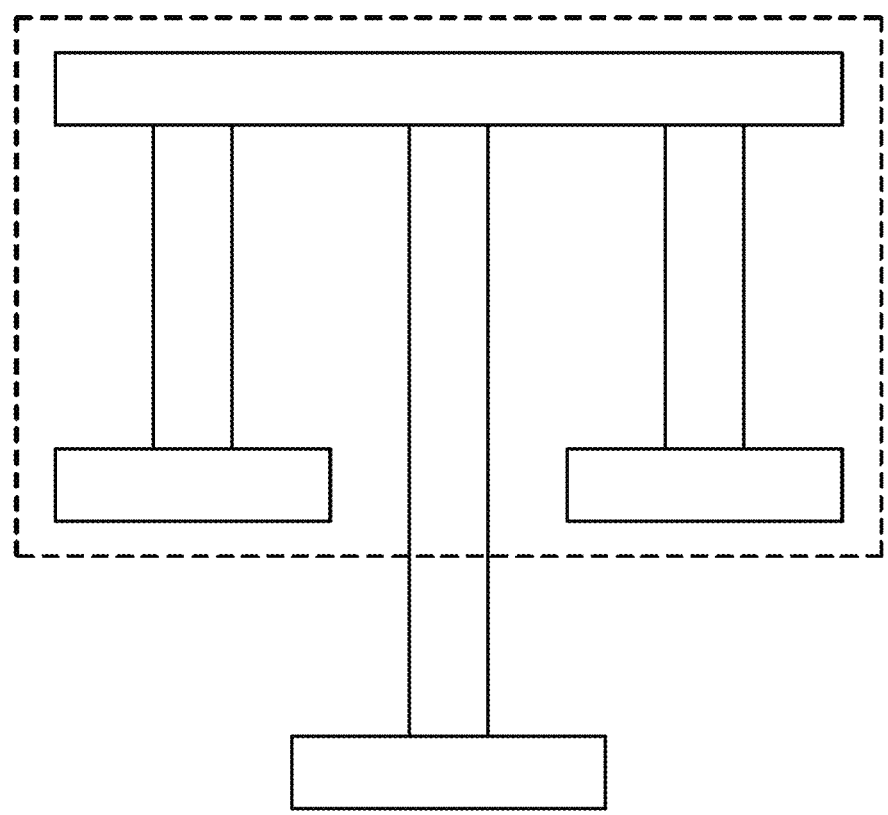
FIG. 26 and FIG. 27 are illustrative schematic diagrams of the possible configuration cases of the ∏ shaped electrode of the embodiment of the invention.

As shown in FIG. 26, in a big set of electrodes (including 7 strip electrodes), a Π shaped electrode as shown in a dash line frame is included, and certainly, the Π shaped electrode can be included in a bigger set of electrodes, which will not be listed herein.

Figure 27:
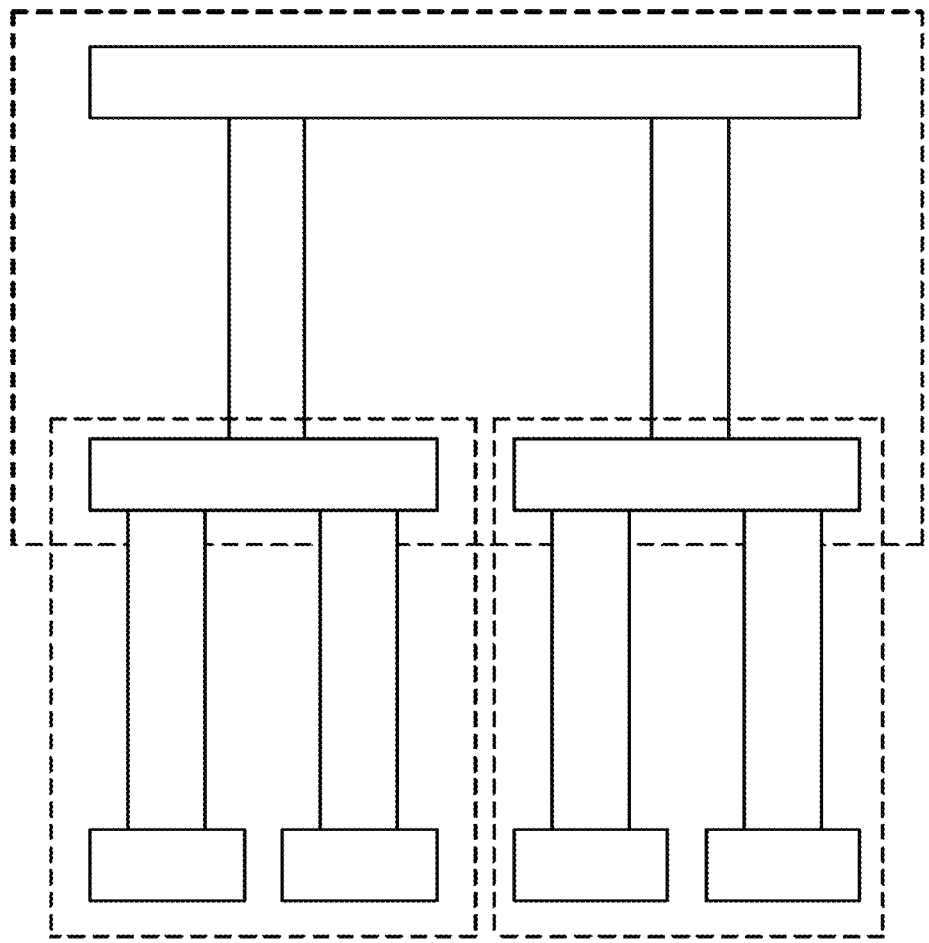

As shown in FIG. 27, three Π shaped electrodes (each dash line frame corresponds to Π shaped electrode) are connected with each other together, to form a big set of electrodes. Certainly, the number of the Π shaped electrodes can be more, or two.

Meanwhile, in FIGS. 26 and 27, the Π shaped electrode has an axially-symmetric pattern as shown in FIG. 2, but it can have any pattern of the above FIG. 3 to FIG. 10, or other possible structures.

Although the above simulations are the simulations made with respect to the wide touch panel, it should be understood that, the Π shaped electrode in the embodiments of the invention applied to normal touch panels can also have advantages of improving the voltage gradient and enhancing the positioning accuracy.

An embodiment of the invention further is to provide an electronic device, including a circuit board and a surface capacitive touch panel, said surface capacitive touch panel comprising: a resistive film, on which an electrode setting area divided into at least two layers is set; and a plurality of conductive electrodes, set in said electrode setting area; said plurality of conductive electrodes including supply electrode; said plurality of conductive electrodes including at least one set of electrodes; wherein, said set of electrodes includes: a first strip electrode; a second strip electrode, in parallel with said first strip electrode, but in a different layer; a third strip electrode, in parallel with said first strip electrode, but in a different layer; said second strip electrode and said third strip electrode being located on the same side of said first strip electrode; a fourth strip electrode, both ends of which are connected with said first strip electrode and said second strip electrode, respectively; a fifth strip electrode, both ends of which are connected with said first strip electrode and said third strip electrode, respectively; and a touch panel driving module, connected with said supply electrode and said board.

Said supply electrode is a right angle electrode.

The electronic device can be various electronic devices which use surface capacitive touch panels to perform touch control, such as notebook computers, ATMs, and so on.

Said touch panel can be a wide touch panel, such as a touch panel with 16:9 or 16:10.

Only preferred embodiments of the invention are described above, it will be obvious that without departing from the principal of the invention, the person skilled in the art can make various modifications and changes, but all such modifications and changes should be considered to be included within the protection scope of the invention.

What is claimed is:

1. A surface capacitive touch panel, comprising:
a resistive film, on which an electrode setting area divided into at least two layers is set; and
a plurality of conductive electrodes, set in said electrode setting area;
said plurality of conductive electrodes including at least one set of electrodes;
wherein, said set of electrodes includes:
a first strip electrode;
a second strip electrode, in parallel with said first strip electrode, but in a different layer;
a third strip electrode, in parallel with said first strip electrode, but in a different layer;
said second strip electrode and said third strip electrode being located on the same side of said first strip electrode;
a fourth strip electrode, wherein a first end of the fourth strip electrode is directly connected to said first strip electrode and a second end of the fourth strip electrode is directly connected to said second strip electrode so that the fourth strip electrode passes through an adjacent layer to the first strip electrode;
a fifth strip electrode, wherein a first end of the fifth strip electrode is directly connected with said first strip electrode and a second end of the fifth strip electrode is directly connected to said third strip electrode so that the fifth strip electrode passes through an adjacent layer to the first strip electrode,
wherein said second strip electrode and said third strip electrode are not in the layer adjacent to said first strip electrode, wherein there is only a portion of the fourth strip electrode arranged perpendicular to the adjacent layer to the first strip electrode in the adjacent layer, and wherein a distance between the first strip electrode and a touch area of the surface capacitive touch panel is greater than a distance between either of the second strip electrode and the third strip electrode and the touch area, and, in connections formed by the fourth and fifth strip electrodes, and the second and third strip electrodes, there is at least one "⊤" shaped connection.

2. The surface capacitive touch panel according to claim 1, wherein, said second strip electrode and said third strip electrode are located in the same layer.

3. The surface capacitive touch panel according to claim 1, wherein, said set of electrodes has an axially-symmetric structure.

4. The surface capacitive touch panel according to claim 1, wherein, said second strip electrode and said third strip electrode have the same length.

5. The surface capacitive touch panel according to claim 1, wherein, said second strip electrode is axially-symmetric with respect to a straight line where the fourth strip electrode is located, and said third strip electrode is axially-symmetric with respect to a straight line where the fifth strip electrode is located.

6. An electronic device, including a circuit board and a surface capacitive touch panel, said surface capacitive touch panel comprising:
a resistive film, on which an electrode setting area divided into at least two layers is set; and
a plurality of conductive electrodes, set in said electrode setting area;
said plurality of conductive electrodes including supply electrode;
said plurality of conductive electrodes including a at least one set of electrodes;
wherein, said set of electrodes includes:
a first strip electrode;
a second strip electrode, in parallel with said first strip electrode, but in a different layer;
a third strip electrode, in parallel with said first strip electrode, but in a different layer;
said second strip electrode and said third strip electrode being located on the same side of said first strip electrode;
a fourth strip electrode, wherein a first end of the fourth strip electrode is directly connected to said first strip electrode and a second end of the fourth strip electrode is directly connected to said second strip electrode so that the fourth strip electrode passes through an adjacent layer to the first strip electrode;
a fifth strip electrode, wherein a first end of the fifth strip electrode is directly connected with said first strip electrode and a second end of the fifth strip electrode is directly connected to said third strip electrode so that the fifth strip electrode passes through an adjacent layer to the first strip electrode; and
a touch panel driving module, connected with said supply electrode and said board,
wherein said second strip electrode and said third strip electrode are not in the layer adjacent to said first strip electrode, wherein there is only a portion of the fourth strip electrode arranged perpendicular to the adjacent layer to the first strip electrode in the adjacent layer, wherein the fourth strip electrode is located in at least one layer other than a layer of the first strip electrode, the adjacent layer, and a layer of the second strip electrode, and wherein a distance between the first strip electrode and a touch area of the surface capacitive touch panel is greater than a distance between either of the second strip electrode and the third strip electrode and the touch area, and, in connections formed by the fourth and fifth strip electrodes, and the second and third strip electrodes, there is at least one "⊤" shaped connection.

7. The electronic device according to claim 6, wherein, said second strip electrode and said third strip electrode are located in the same layer.

8. The electronic device according to claim 6, wherein, said set of electrodes has an axially-symmetric structure.

9. The electronic device according to claim 6, wherein, said second strip electrode and said third strip electrode have the same length.

10. The electronic device according to claim 6, wherein, said second strip electrode is axially-symmetric with respect to a straight line where the fourth strip electrode is located, and said third strip electrode is axially-symmetric with respect to a straight line where the fifth strip electrode is located.

11. The electronic device according to claim 6, wherein, said surface capacitive touch panel is a wide touch panel.

* * * * *